July 21, 1970

G. D. PRUDER ET AL 3,521,348

METHODS AND APPARATUS EMPLOYING TORSIONAL
VIBRATORY ENERGY FOR WRENCHING

Filed Dec. 7, 1967

INVENTORS
GARY D. PRUDER
NICHOLAS MAROPIS
JAMES BYRON JONES

BY: Wolfe, Hubbard, Voit + Osann ATTORNEYS

United States Patent Office 3,521,348
Patented July 21, 1970

3,521,348
METHODS AND APPARATUS EMPLOYING TORSIONAL VIBRATORY ENERGY FOR WRENCHING
Gary D. Pruder, Newark, Del., and Nicholas Maropis and James Byron Jones, West Chester, Pa., assignors to Aeroprojects Incorporated, West Chester, Pa., a corporation of Pennsylvania
Filed Dec. 7, 1967, Ser. No. 688,867
Int. Cl. B23p *11/00, 19/00, 19/04*
U.S. Cl. 29—428
13 Claims

ABSTRACT OF THE DISCLOSURE

Methods and apparatus for applying high intensity vibratory energy in the torsional mode of vibration for wrenching of threaded fastener connections.

An ultrasonic wrenching method wherein ultrasonic vibration in the torsional mode is applied substantially simultaneously with mechanical tightening and frictional effects are controlled.

---

The present invention relates generally to methods and apparatus for torsional vibratory wrenching, and more particularly, to torsional vibratory methods and apparatus for applying torque to threaded fastener connections and the like. In its principal aspect, the invention is concerned with improved methods and apparatus for tightening and for loosening threaded fasteners by applying vibratory energy in the torsional mode of vibration to the threaded fastener together with the mechanical application of torque, whereby ordinarily adverse effects of friction can be controlled and more beneficially utilized.

Numerous different approaches have heretofore been utilized for making mechanical connections. Threaded fasteners are commonly employed where non-permanent connection is desired, and there has been much concern over prevention of threaded fastener failure which, though not attributable to the design of the fastener, can often be traced to the manner in which tightening was accomplished. As is well known, the tightening process imparts to threaded fasteners a degree of tension stress which will hereinafter be referred to as preload. It is generally understood that, as the preload in a threaded fastener increases, there is a corresponding increase in the ability of the threaded fastener connection to withstand static or cyclic loads which tend to pull, bend, or shear the connection. If, for example, the preload established on the fastener connection is greater than the service load, there will be no appreciable stress variation during use and therefore no failure of the threaded connection by fatigue regardless of the number of load cycles on the connection.

Other requirements of importance in the preloading of fasteners are that the applied preload survive throughout the service life of a fastener and that, where multiple fasteners are utilized in providing a large junction, uniform preload be established among the fasteners.

Commonly used techniques for manual torque wrenching or impact wrenching have been unable to convert desirable percentages of the exerted torque force into fastener preload nor do these techniques permit consistent or sufficiently accurate control of the degree of preload achieved. This unreliability of applied torque as an index of fastener tension is generally understood to be caused by friction.

Friction between the mating surfaces of threaded connections is directly or indirectly affected by complex and interrelated variables such as oxide or scale, surface texture, type of coating, lubrication, speed of tightening, etc., so that prediction of preload on the basis of known tightening-torque is only at best a rough approximation. Friction is reportedly responsible for dissipating up to 90 percent of the torque applied in tightening fasteners with prior techniques and thus only a small percentage of the torquing effort is ordinarily realized in establishing the preload. Moreover, due to design considerations, threaded fasteners are often preloaded at only 35 to 45 percent of their ultimate tensile strength. Relief of torsional stress induced into the fastener during the torquing processes is often necessary which too reduces the degree of preload.

Because of the foregoing limitations imposed by virtue of the adverse frictional effects involved in making threaded fastener connections, various devices such as for example strain gauge bolts, strain indicator bolts, or crush washers have been utilized. However, such devices also vary in effectiveness, are not always available when needed, and increase the cost of assemblies.

Another approach commonly employed as a solution to the problem of adverse frictional effects and preloading difficulties is the use of high stress lubricants, but not only have resulting preloads been found to depend significantly upon the type of lubricant used, but such lubrication causes further undesirable effect due to significant reduction of resident friction which, when threads are unlubricated, prevents the loosening of a tightened connection which occurs particularly when the connection is subjected to dynamic forces exerted against it during service loading. The prevention of loosening being obviously important, resort has been made to the use of interference threads, lock or star washers or other auxiliary devices to increase friction or provide mechanical locking to prevent loosening of the joint.

It has thus been recognized that friction is a detriment to mechanical assembly of threaded fasteners in that it reduces and obscures the degree of preload obtainable, but that once the threaded fastener is tightened, friction becomes a benefit by operating to reduce "back-off" of the threaded connection with resulting loss of the desired preload. The techniques and equipment heretofore utilized for tightening threaded joints have not provided a satisfactory solution to the problem of adverse effects of friction during tightening while maintaining the benefits of friction after tightening without resort to specialty items and the like to prevent loosening.

There is disclosed and claimed in copending application Ser. No. 688,868 filed Dec. 7, 1967 in the name of Nicholas Maropis and entitled "Methods and Apparatus Employing Vibratory Energy for Wrenching," methods and apparatus which employ flexural mode vibration primarily suitable for tightening of flared tube couplings and like workpieces which are characterized by structural compliance along their radius vectors. However, the flexural-mode method and apparatus disclosed and claimed in the aforementioned copending application have not been found highly effective for vibratory activation of more rigid threaded connections which, not being hollow and not presenting thin flexible walls, are not readily susceptible to flexure as are tubes and flared tube fittings. In affecting the rotation of threaded fasteners, a vibratory wrench driven in the torsional mode of vibration has been determined advantageous over one designed for flexural or axial delivery of acoustic energy. Normally, with the use of the torsional vibratory mode, there exists a relatively poor acoustic coupling between the threaded fastener member and the surrounding structure, as well as between a fastener member and the second, or mating, member of the fastener. The torsional mode of excitation is best able to realize advantage from the above poor coupling circumstance, being recognized among acoustic modes as one of the least suitable modes for the transmission of acoustic energy across interfaces of the type associated with threaded fasteners. It will be understood that the highest vibratory effect at the threads may be induced when the amplitude there delivered is not readily transmitted to contiguous parts of an assembly. Torsional mode excitation has thus the capability for essentially localizing vibratory micromotion at the threads and interfaces where its effect is maximum in reducing friction. It can be appreciated that if the bolt or nut were to be driven axially or flexurally, much higher percentages of the applied vibratory energy could be conducted away from the locales which are critical to the objects of the present invention.

Accordingly, it is a general aim of the present invention to provide methods and apparatus for applying torque to threaded fasteners in a manner such as to overcome disadvantages of the prior art hereinabove cited and to alter and make predictable the torque-tension relationship by means of the application of vibratory energy. In this connection, it is an object of the present invention to provide methods and apparatus for improved control of the effects of friction in the torquing of threaded fastener connections.

Yet another important aspect of the present invention is to provide methods and apparatus which enable predicting and controlling the degree of preload established in the tightening of threaded fastener connections.

It is a further object of the present invention to provide improved methods and apparatus for increasing the degree of threaded fastener preload attainable, thus realizing preload values approaching the ultimate tensile strength of the fastener.

It is still a further object of the present invention to provide methods and apparatus for tightening threaded joints in a manner such as to maintain preload by effecting a state of increased residual friction between the fastener members without the use of auxiliary devices or specialty fastener designs.

In another of its aspects, it is an object of the present invention to provide vibratory wrenching methods and apparatus for improving interference fit performance of threaded fastener connections. Moreover, the present invention may be used for improving sealing characteristics of interference threads of threaded fasteners.

It is yet another object of the present invention to provide methods and apparatus for tightening threaded connections which reduce the degree of torsional stress heretofore induced during the torque tightening of the connections.

It is another object of the present invention to provide methods and apparatus for applying torque to threaded connections which are suitable for applications not requiring devices for the measurement of applied torque or calculations of preload values, such as applying torque to threaded connections to effect non-precision tightening of threaded fastenings or to enable facile removal of bound or jammed threaded fastenings.

Other objects and advantages of the invention will become apparent as the following description proceeds, taken in conjunction with the accompanying drawings, in which.

With prior devices and techniques for tightening threaded fasteners, the relationship between torque and preload has been controlled by the friction characteristics at mating interfaces, and the amount of preload developed with application of the same torque has been found to deviate among several fasteners of the same type and in the same environment due to the many variables that affect friction.

We have discovered that by application of torsional mode vibratory energy during the application of torque to the rotated threaded fastener member, friction may be transiently reduced while torquing, thus liberating the torquing process from the undeterminable effects of friction on preload and thus providing a novel and primal basis for establishment of a valid torque-tension relationship. Accordingly, the present invention contemplates applying torsional mode vibratory energy together with the application of mechanical torque to threaded fastener connections in order to substantially control and beneficially utilize friction so that it is minimized during application of torque yet left at maximum residual force after the fastener is tightened and its preload is established.

The invention thus generally characterized may be utilized in various modified and alternative forms, such for example as integral ultrasonic torque wrenches shown in FIGS. 1–6 of the drawings, attachments to generally conventional torque wrenches as shown in FIGS. 7–11, and a non-indicating ultrasonic wrench as shown in FIGS.

13–14. It is to be understood that we do not intend to limit the invention by such illustrative specific embodiments, but aim to cover all modifications, equivalents, and alternatives falling within the spirit and scope of the invention as expressed in the appended claims.

Figures 1, 2, 3:
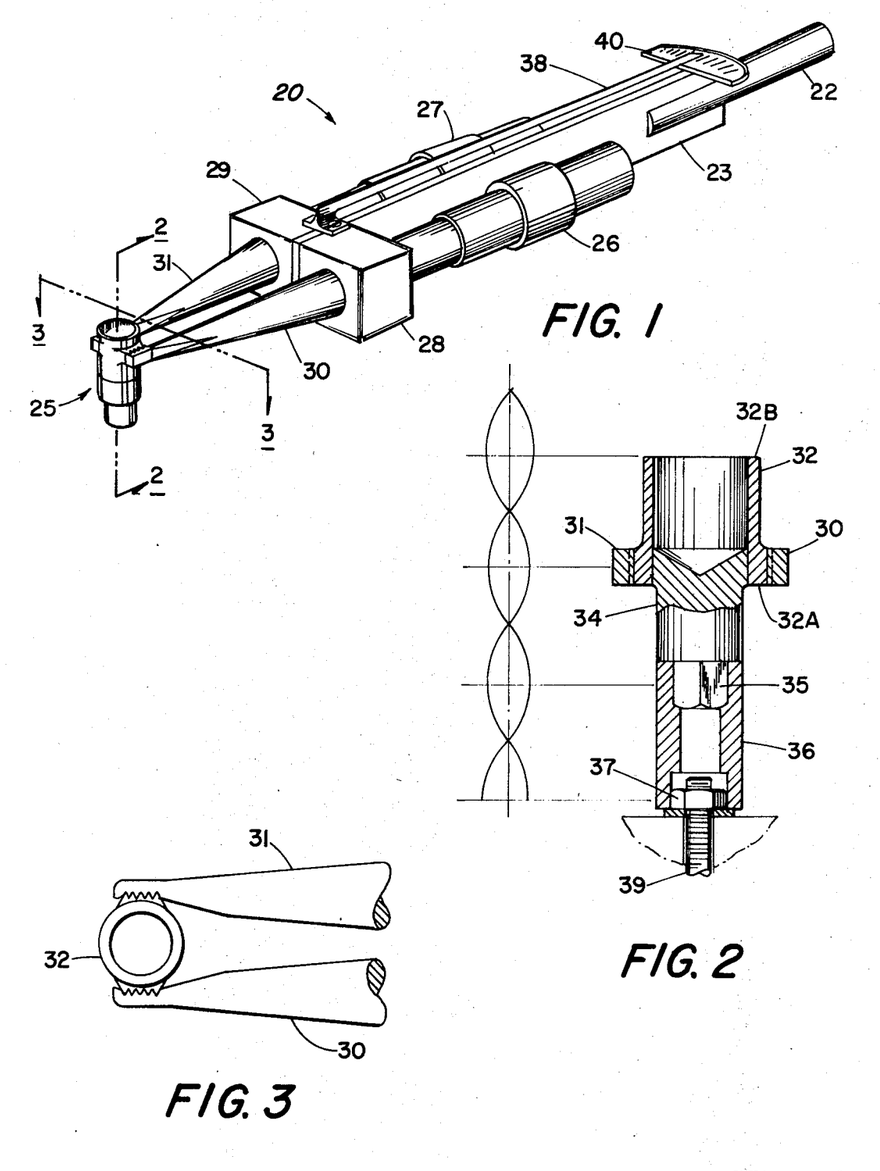
FIG. 1 is a view in perspective of an exemplary vibratory wrenching apparatus embodying the features of the present invention, such apparatus here shown incorporating a pair of parallel transducer-coupling systems mounted adjacent opposite sides of a single beam.
FIG. 2 is an enlarged fragmentary transverse sectional view taken along line 2—2 in FIG. 1 with the wrench head and tool of the apparatus in FIG. 1 here shown positioned upon a nut in readiness for applying a torque, together with a wave form diagram depicting the acoustical design of the components.
FIG. 3 is an enlarged fragmentary top view of the wrench head of the apparatus shown in FIG. 1 taken along line 3—3 of FIG. 1.

Referring now to the drawings, there is illustrated in FIG. 1 an exemplary integral vibratory wrenching apparatus generally indicated as 20, which is suitable for applying a torque to a threaded fastener in accordance with the present invention.

As best shown in FIG. 1, the exemplary apparatus 20 comprises a handle 22 secured adjacent one end thereof and a pair of mounting blocks 28, 29 attached adjacent the opposite end of the beam. A pointer member 38 secured to the mounting blocks and a scale 40 provide an indication of deflection of the beam 23 in appropriate units of applied torque.

For the purpose of driving the wrench head 25 in a requisite torsional vibratory mode, there is provided a pair of transducer units 26, 27 mounted, preferably by force-insensitive means, on opposite sides of the beam 23 to blocks 28, 29, respectively, and respective couplers 30, 31. The couplers 30, 31 each have inwardly extending end portions which are tangentially affixed, preferably by brazing or some other type of metallurgical joint, to the wrench head 25.

With the two transducers 26, 27 and the couplers 30, 31, torsional motion is effectively produced in the wrench head 25 by driving the transducers 180 degrees out of phase. Thus, in the configuration illustrated in FIG. 1 the respective transducers and associated couplers are operated so as to be 180 degrees out of phase with one another. This can be accomplished electrically by straightforward and well known methods, or it may be accomplished mechanically by fabricating one of the wave guides ½ wave longer than the other.

Referring to FIGS. 1, 2 and 3 conjointly, the couplers 30, 31 are affixed tangentially to a cylindrical member 32 in any suitable manner such as brazing. To impart additional strength to the attachment of the components, they may be formed with teeth or serrations at the points of attachment as best shown in FIG. 3. As best shown in FIG. 2, the ends of couplers 30, 31 are attached opposite one another on the periphery 32a of cylindrical member 32 while the other end 32b of the cylindrical member remains free. A preferably torsionally-resonant drive member 34 telescoped into and metallurgically attached to cylindrical member 32 is provided with a suitable adapter 35 for receiving a tool head 36 such as the "snap on" socket shown applied to a nut 37 of threaded fastener 39.

Each element of the wrench head 25, specifically element 32 and element 34 as well as the "snap on" portion 36, preferably is designed to be resonant in torsion as indicated by the wave form diagram adjacent the assembled elements shown in FIG. 2. As thus indicated, the arrangement is such that junctures between the elements of the wrench head 25 and area of contact between the tool and fastener are at antinode or loop regions of vibration so that substantially low cyclic stress areas occur at such locales.

Since, in accordance with known principles, transmission of appropriate amplitudes of vibration to the thread zones of fasteners can be assured under all conditions of loading as long as whole number multiples of ½ wave length are employed in dimensioning the components of the wrench head assembly, extensions of any length may be introduced for "snap on" attachment between the adapter 35 and the tool head 36 as long as such extensions may be acoustically dimensioned and yet conform to the mechanical requirements of the application.

For details of materials suitable for construction of the couplings and wrench head components, cross reference is made to James Byron Jones, U.S. Pat. 3,257,721 entitled "Method and Apparatus for Employing Torsional Vibratory Energy," issued June 28, 1966.

In carrying out the present invention, provision is made for mechanically applying a predetermined torque to a threaded fastener and then applying vibratory energy while continuing the application of mechanical torque required to maintain the predetermined torque value. To this end, there is provided controlled transmission of vibratory energy from the transducer units 26, 27 and couplings 30, 31 through the torsionally-resonant wrench head 25 conjoined with the mechanical drive of the wrench whereby vibratory energy in the proper mode of vibration is delivered to the thread zone of the fastener.

In order to provide the requisite high frequency electrical power to the transducer units 26, 27 a frequency converter (not shown) of a type adapted to change the standard AC power line frequency to match a mechanical elastic vibratory frequency of the transducer units is required. Such a frequency converter needs be capable of accepting 60-cycle AC electricity and converting same into alternating electrical current in a preferred frequency range of about 7,500 to 90,000 cycles per second, with 15,000 to 50,000 cycles per second being the most useful range. Normally the choice of frequency is dictated by its suitability to the apparatus utilized in a given application or sets of applications. The above broad frequency range includes both the audible range (up to about 15,000 cycles per second) and the ultrasonic range (generally above about 15,000 cycles per second) with the ultrasonic (inaudible) range being most useful and also advantageous from the standpoint of operator comfort. In addition to delivering electrical power at the resonant frequency of the transducer-wrench assembly, a suitable frequency converter must also be capable of matching the widely varying electrical impedance presented by the loaded wrenching assembly.

Depending upon the size of the ultrasonic wrench, frequency converters capable of the above demands may include electron tube units, transistorized devices, or silicon controlled rectifier apparatus of types generally familiar to the electronics industry.

For details of one type of transducer unit that is suitable, and in many cases preferable, for use with the present invention, cross reference is made to James Byron Jones and Nicholas Maropis, U.S. Pat. 3,283,182 issued Nov. 1, 1966 and entitled "Transducer Assembly." The transducer array may preferably utilize a ceramic transducing material such as lead zirconate titanate; however, other known types of arrays may be substituted, such as magnetostrictive (including the powdered metal ferrite type) or piezoelectric transducers.

In order to mount the transducer units 26, 27 into the wrench so as to minimize frequency shift of the vibratory apparatus and loss of vibratory energy to the associated mounting blocks 28, 29 and beam 23, force-insensitive mounts may be provided. Such force-insensitive mounts may, in general, be cylindrical shells one-half wave length long at the operating frequency and made from 303 stainless steel or other low hysteresis material such as nickel, aluminum bronze, beryllium-copper or K-Monel. One end of each shell is metallurgically bonded to the respective coupler 30 or 31, preferably at an antinode or loop region of the vibration on the latter, and the other end of the shell is free from attachment. The mounting blocks 28, 29 are attached to the respective shells ¼ wave length from the free end of the shell where a true node exists in the shell, in accordance with force-insensitive mounting principles described in U.S. Pats. 2,891,178; 2,891,179; and 2,891,180; each of which issued in the name of William G. Elmore and is entitled "Support for Vibratory Devices."

Figures 4, 6:
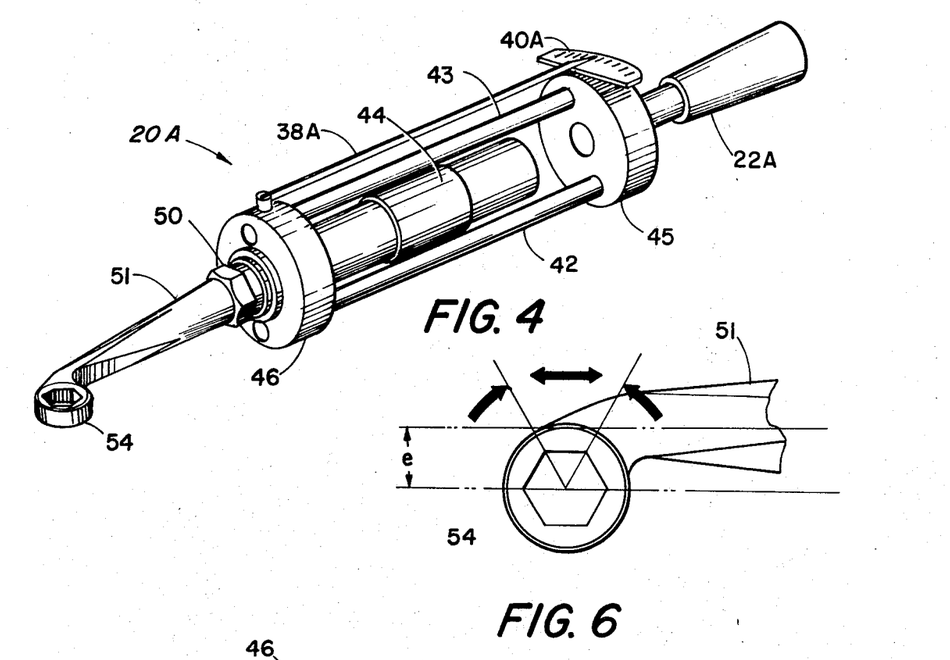
FIG. 4 is a view in perspective of a modified form of wrenching apparatus embodying the features of the present invention, such apparatus here shown employing a single transducer-coupling system and a detachable wrench head coupler with an eccentrically designed terminal wrench head for the delivery of torsional vibration while applying a torque in accordance with the invention.
FIG. 6 is an enlarged plan view of the terminal wrench head of the apparatus of FIG. 4, together with a generalized schematic illustration of the ultrasonic mode conversion capability of the wrench head of the apparatus of FIG. 4.

Referring now to FIG. 4, a modified form of integral vibratory wrenching apparatus generally indicated as 20A has been depicted.

The exemplary apparatus 20A comprises an ultrasonic torque wrench including a handle 22A, a pair of spaced side beams 42, 43 which receive a transducer unit 44 therebetween, and a pair of spaced mounting blocks 45, 46 attached to the beams and receiving the handle 22A and transducer unit 44 respectively.

For the purpose of measuring the extent of deflection of the beams 42, 43 in terms of inch-pounds of torque, there is provided a pointer member 38A secured to mounting block 46 and cooperating scale 40A secured to mounting block 45. The arrangement is such that, by way of bending deflection in the members 42, 43, displacement of the handle end portion of the apparatus with respect to the wrench head end portion provides a direct indication by the pointer on the scale of torque being applied with the wrench.

As here shown, the transducer unit 44 is provided with a force-insensitively-mounted coupler assembly 50 which traverses the mounting block 46 toward an intimate juncture with a detachable wrench head coupler 51 which in turn extends to comprise the terminal wrench head 54 where engagement of the fastener is effected.

Figure 5:
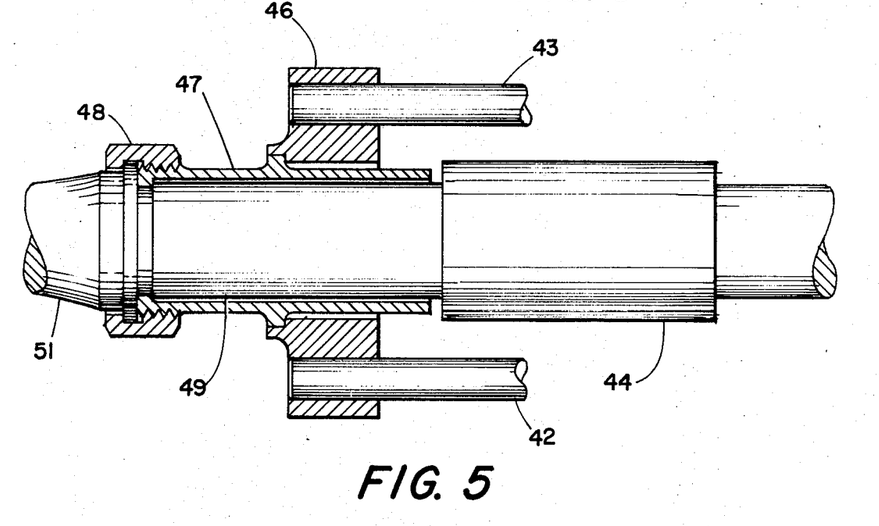
FIG. 5 is an enlarged transverse sectional view of the force-insensitive mount utilized in the apparatus of FIG. 4.

FIG. 5 shows the details of the force-insensitive mounting of apparatus 20A whereby the coupler 49 is rigidly mounted in, but acoustically isolated from, the mounting block 46, and indicates the mounting sleeve 47 and the clamping nut 48 which rigidly affixes the components of the assembly.

Referring to FIG. 6, it will be noted that the central axis of the terminal wrench head 54 is offset from the longitudinal axis of the wrench head coupler 51 by a distance $e$. By means of this eccentric design, angular displacements are imparted to the terminal wrench head 54 by the longitudinal vibrations of the wrench head coupler 51 and torsional drive is thus induced at the terminal wrench head 54 in a manner generally indicated by the diagram.

The wrench head coupler 51 whose terminal tool 54 is shown as a box end in FIGS. 4 and 6 may terminate in other conventional or specific engagement fixtures without departing from the present invention.

Consistent with description heretofore provided for apparatus 20, resonant elements of apparatus 20A are preferably dimensioned to have an over-all physical length substantially equal to an acoustical length comprising a whole number multiple of ½ wave length in the materials and configurations when operating at a suitable frequency.

Figures 7, 8, 9:
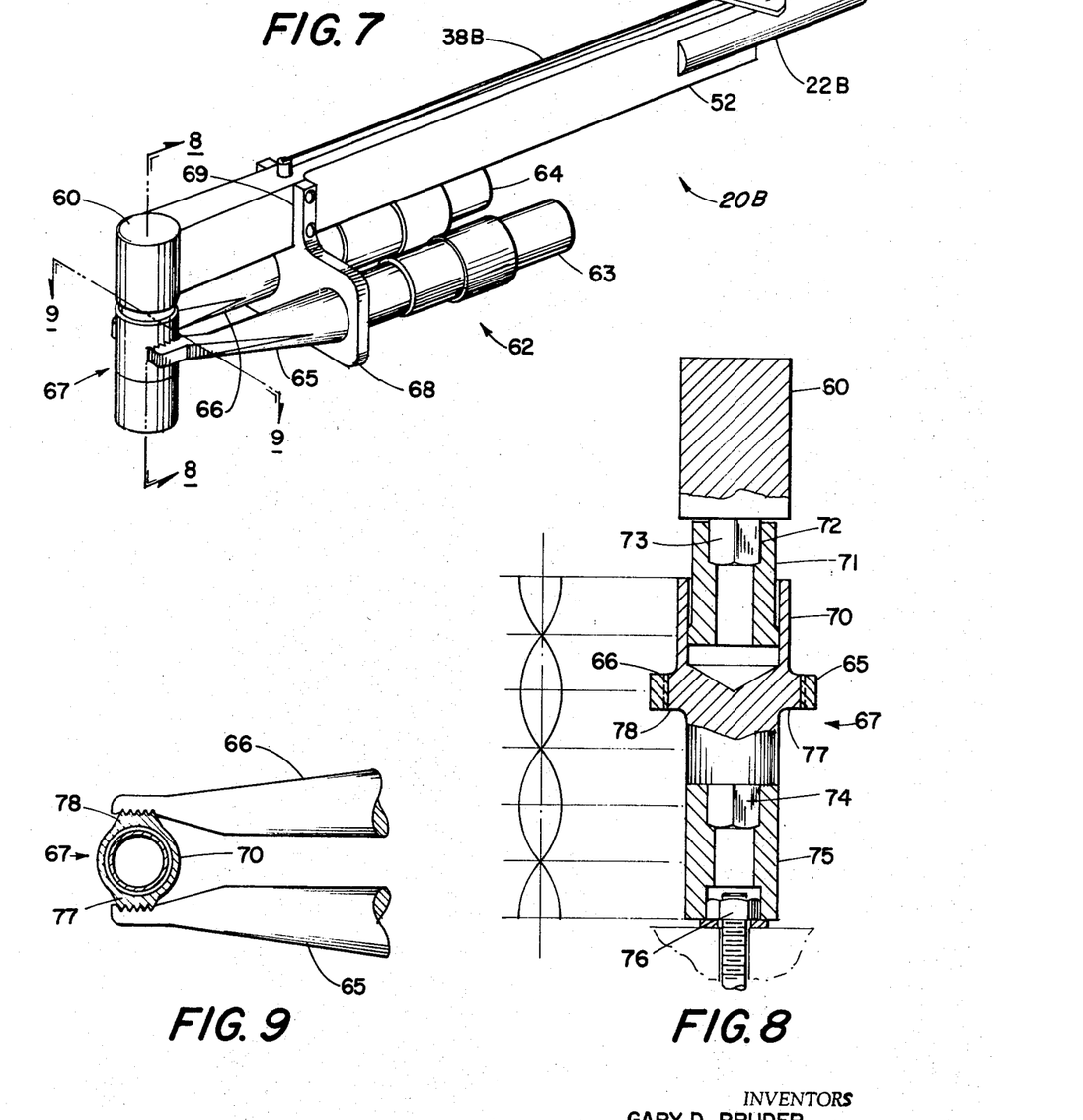
FIG. 7 is a view in perspective of yet another exemplary vibratory wrenching apparatus which is an attachment embodying the features of the present invention, such apparatus here shown employing a pair of parallel transducer-coupling systems adapted for mounting to a conventional type of single beam torque wrench.
FIG. 8 is an enlarged fragmentary sectional view taken along line 8—8 in FIG. 7, showing the vibratory wrench head and tool of the apparatus shown in FIG. 7 positioning upon a bolt head, together with a diagrammatic illustration of the wave form for acoustical design of the components.
FIG. 9 is a view taken along the line 9—9 in FIG. 7.

Turning to FIG. 7, there is shown another form of vibratory wrenching apparatus which may be attached to a generally conventional type of torque wrench such as that designated as 20B. Torque wrench 20B includes a single beam 52 having a handle 22B at one end thereof and a tool receiving head 60 mounted at the opposite end of the beam. While a pointer member 38B and a scale 40B are provided to indicate deflection of the beam in terms of appropriate units of torque, it will be appreciated that among the various manual torque-indicating wrenches available, other arrangements may be employed for indicating torque.

In carrying out the present aspect of the invention, the vibratory wrenching attachment generally indicated at 62 comprises a pair of transducers 63, 64 with respective couplers 65, 66 and an acoustical adapter 67 attached to the end portions of the couplers. A hanger member 68 bridges the respective transducers and couplers and is provided with a generally upstanding slotted portion 69 through which the heavy portion of the beam 52 passes. The portion of the beam toward the handle 22B from hanger 68 is thinned so as to localize beam deflection between the handle and the hanger, and it will be noted also that the beam 52 is considerably thickened between the hanger 68 and the tool receiving head 60 so as to prevent deflection in this locale.

Referring to FIG. 8, the acoustical adapter 67 is generally cylindrical and includes a sleeve portion 70 defining a free end which receives an isolator member 71, brazed or otherwise suitably attached to the inner surface of the sleeve. The isolator member is provided with a polygonally shaped opening 72 adapted to receive a correspondingly shaped drive shank 73 of tool receiving head 60. The opposite end of adapter member 67 is formed into a polygonally shaped drive shank 74 adapted to receive tool attachments such as socket 75 for tightening a bolt head 76 and the like.

Intermediate the ends of adapter member 67 there is provided a pair of mounting pads 77, 78 disposed on opposite sides of the outer wall of member 67. The pads 77, 78 are ribbed and the ends of couplers 65, 66 are brazed or otherwise fived to the respective pads as is best shown in FIG. 9.

As shown diagrammatically in FIG. 8, the adapter member 67 is dimensioned to have an overall physical length of two acoustical ½ wave lengths, with the junctions between components being located at antinodes or loop regions of vibration. However, the isolator member 71 is mounted ¼ wave length from the free end of sleeve portion 70 so that a true node will develop at the isolator member providing a force-insensitive attachment to the tool receiving head 60.

Figure 10:
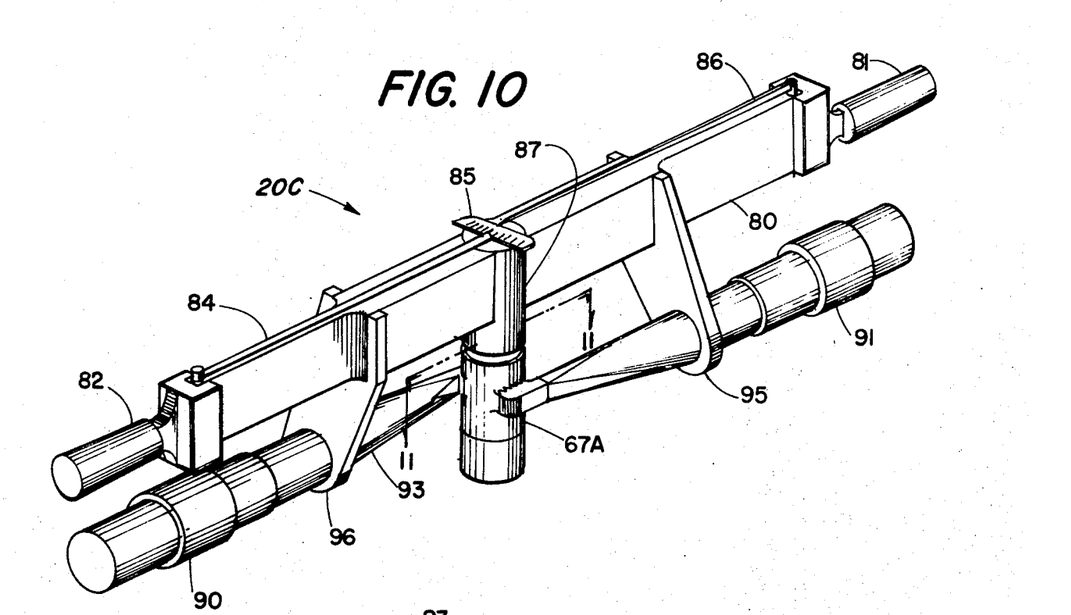
FIG. 10 is a view in perspective of still another exemplary vibratory wrenching apparatus attachment employing the features of the present invention, such apparatus here shown with a pair of directionally opposed transducers and coupling units mounted on a conventional two-handle single beam torque wrench.

Referring to FIG. 10, there is shown still another form of vibratory wrenching apparatus which may be attached to a standard type T-shaped torque wrench generally indicated as 20C. The wrench includes a single beam 80 having a pair of handles 81, 82 secured to the opposite ends of the beam. A rod 84 attached to handle end portion 82 and carrying a torque scale 85, and a pointer member 86 supported at handle end 81 serve to indicate torque applied with the wrench. Centered in the heavy portion of the beam 80 to insure deflection outside of the transducer hanger supports is a tool receiving head 87 which receives an appropriate adapter component of the ultrasonic attachment.

Figure 11:
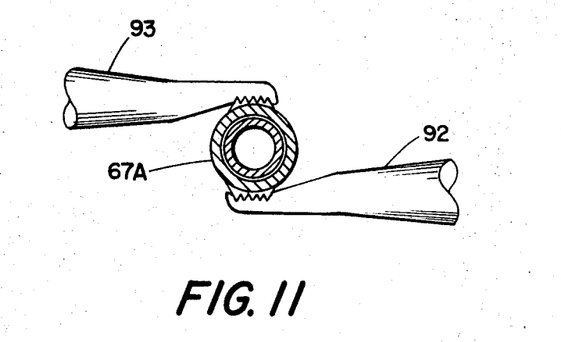
FIG. 11 is a view taken along the line 11—11 in FIG. 10.

The vibratory wrenching attachment for the torque wrench 20C includes a pair of transducers 90, 91 and respective couplers 92, 93 oppositely oriented with respect to each other, the ends of the couplers being affixed on opposite sides of an acoustical adapter member 67A as shown in enlarged detail in FIG. 11. Hanger members 95, 96 interconnect the respective transducer-coupler systems to the heavy portion of beam 80 by way of force-insensitive mounting such as has been described for other embodiments herein presented.

The acoustical adapter shown at 67A comprises a sleeve with an isolator member metallurgically affixed to the inner surface of the sleeve approximately ¼ wave length from the free end of the sleeve, said isolator member being provided with a socket or other suitable means for attaching it to the drive end of the wrench head 87. A cylindrical tool head telescoped within and metallurgically affixed to the lower end of said sleeve terminates in a tool supporting shank which may receive tool attachments of various types. From the immediately foregoing description it will be apparent that the acoustical wrench head utilized with apparatus 20C is essentially identical to that shown in FIG. 8 which depicts a sectional portion of the ultrasonic attachment to apparatus 20B.

Having in mind the foregoing structural details of idealized exemplary apparatus in accordance with the present invention, a brief description of a typical vibratory wrenching operation will serve to facilitate an understanding of the methods of the present invention. To this end, reference is first made to FIG. 12 wherein there is shown particular results of the application of vibratory wrenching to an exemplary threaded fastener with the resulting graph also showing the sequence of the present method. Thus, in carrying out the present method, once the optimum preload desired for the fastener to be tightened is established and based upon predetermined torque-tension relationships for vibratory torque wrenching in accordance with the present invention, the appropriate torque value to provide the required preload is selected, the fastener is mechanically rotated until the selected torque level is reached as indicated by the wrench torque indicating mechanism and then the ultrasonic power is activated to apply vibratory energy to the rotated member of the fastener. While the vibratory energy is being applied, further mechanical rotation of the wrench is employed to maintain the selected torque value; thereafter, turning off the power and removing the wrench results in the desired preload having been applied to the fastener.

Figure 12:
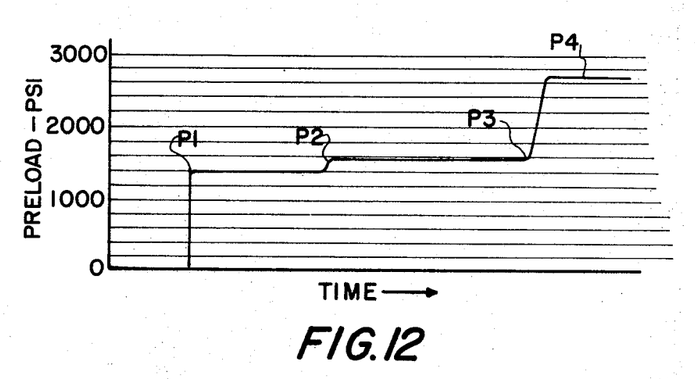
FIG. 12 is a graph showing the preload on a bolt during a torquing sequence as produced in accordance with the present invention.

In a specific example, the results of which are represented in FIG. 12, a ⅜-inch 16NC bolt 2 inches long was tightened with apparatus and methods in accordance with the present invention with the application of 500 watts of power and by applying torsional mode vibratory energy through a standard socket. The bolt was initially tightened mechanically applying an indicated 60 inch-pounds of torque which resulted in the application of 1400 pounds of preload as shown by P1 on the graph. While the wrench position was maintained to prevent "back-off," vibratory energy was applied resulting in the instantaneous rise in the graph P2 which is indicative of relief of torsional stress and further engagement of the threads. With the maintenance of the vibratory energy at the new preload level P3, approximately 1550 pounds of preload, the torque value then registered as 40 inch-pounds. The vibratory energy was then continued and further mechanical rotation was applied to restore the torque level back to 60 inch-pounds, which resulted in an increase of preload to 2700 pounds as indicated at P4.

Figure 13:
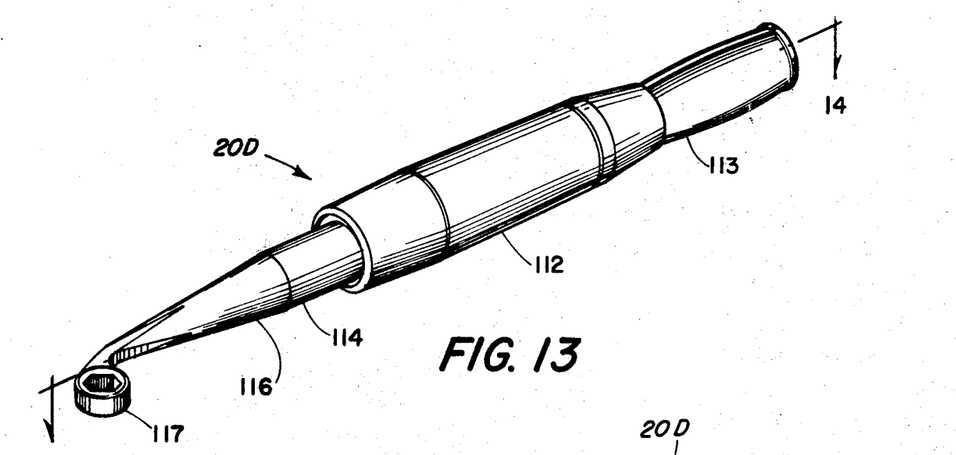
FIG. 13 is a perspective view of still another embodiment of the invention which is a non-indicating ultrasonic wrench for tightening or loosening of fasteners.
Figure 14:
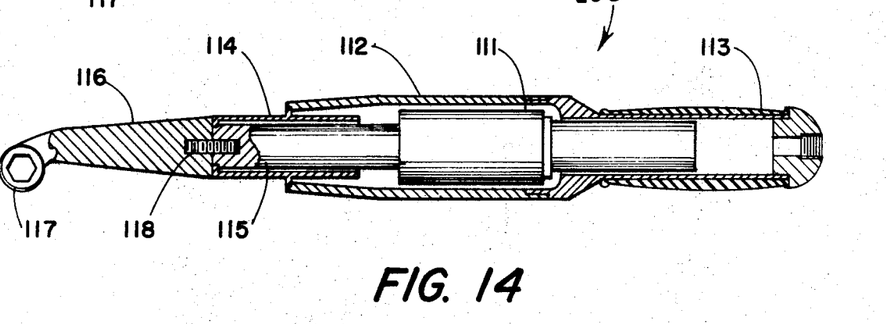
FIG. 14 is a sectional view taken along line 14—14 in FIG. 13.

In FIGS. 13 and 14 there is shown in perspective and in cross section, respectively, an exemplary non-indicating ultrasonic wrench generally indicated as 20D which, while not having capability for accurate preloading of threaded fasteners in accordance with the methods described above, is particularly suitable for loosening bound or jammed fasteners or for tightening fasteners in instances where measured torque is not required. Apparatus 20C utilizes a detachable wrench head coupler with capability for longitudinal-to-torsional mode conversion in a manner hereinabove described for apparatus 20A.

Referring to the details of FIG. 14, the transducer assembly 111 is enclosed in an acoustically-isolated housing 112 which serves to support the handle 113 used in direct torque exertion and which is preferably mounted to the transducer and coupler by means of a force-insensitive mount 114 such as hereinabove described. The forward coupler 115 traverses the mount 114 and is joined by means of stud 118 to the detachable wrench head coupler 116 which is acoustically designed for delivery of torsional vibration to the terminal wrench head 117 and thence to a threaded fastener member engaged thereby. Wrench head coupler 116 may be constructed to terminate in various types of fixtures of suitable mechanical and acoustical design without departing from the present invention.

Although not to be construed as limiting the use of the apparatus 20D to a particular sequence of operation, a preferred mode of carrying out this embodiment of the invention is first to exert manual force to an appropriate mechanical limit in the direction required, then to introduce ultrasonic energy to appropriately reduce the frictional forces opposing the tightening or loosening of a threaded fastener member, while at the same time continuing to exert mechanical force in the direction required.

Thus, it can be seen that the present invention provides an effective, convenient means for vibratory tightening of fasteners, controlling preload in making fastener connections, reducing torsional stress induction during the making of fastener connections, removing bound or jammed fasteners, reducing loosensing tendencies of fastener connections, improving interference fit performance of fastener connections and improving sealing characteristics of interference threads of threaded fasteners and the like. Moreover, with the apparatus of the present invention, the same preload can be achieved with less torque than is required for the conventional wrench, thus permitting the use of a shorter torque arm or the exertion of less force than heretofore possible.

While we do not wish to be bound by any theory as to the mechanism by which the methods and apparatus of the present invention are effective in achieving the indicated results, it has been demonstrated that the torsional elastic vibratory component enables an extraordinary reduction of friction between the excited or vibrated component of the fastener and the mating fastener member.

We claim as our invention:

1. The method of wrenching threaded fastener connections comprising the steps of mechanically applying a torque to the member to be rotated and substantially simultaneously applying torsional mode vibratory energy to said member at a frequency in the range of from about 7500 cycles per second to about 90,000 cycles per second.

2. The method of wrenching threaded fastener connections comprising the steps of mechanically applying a predetermined amount of torque selected to provide a required preload to the threaded fastener at a frequency in the range of from about 7500 cycles per second to about 90,000 cycles per second, and continuing the mechanical application of torque required to maintain the selected torque level applied to said fastener.

3. The method in accordance with claim 2 in which said vibratory energy has a frequency of between about 20,000 to 50,000 cycles per second.

4. A vibratory wrenching apparatus comprising in combination, a generally elongated wrench having a handle portion and a wrench head, means including a transducer mounted to said wrench and coupling means transmitting vibratory energy from the transducer to the wrench head in the torsional vibratory mode at a frequency in the range of from about 7500 cycles per second to about 90,000 cycles per second.

5. A vibratory wrenching apparatus in accordance with claim 4 wherein said coupling means comprises a metal member having one end attached to the transducer, and the opposite end of said member comprising said wrench head, the longitudinal axis of said coupling means being offset from the central axis of said head.

6. A vibratory wrenching apparatus in accordance with claim 4 wherein said wrench head comprises a sleeve member, said coupling means being attached adjacent one end of said sleeve, the opposite end of said sleeve being free from attachment, a resonant drive member telescoped into and attached to said one end of the sleeve and adapter means associated with said drive member for receiving a threaded fastener engaging tool head.

7. A vibratory wrenching apparatus for applying torque to threaded fastener connections and the like having a source of high frequency electrical power and comprising, in combination, means coupled to said source of power for generating mechanical vibratory energy at a frequency in the range of from about 7500 cycles per second to about 90,000 cycles per second, a wrench including a handle portion and at least one beam member extending outwardly therefrom, means including a wrench head for mounting said vibratory energy generating means on said beam adjacent the beam opposite said handle portion, and means for coupling said wrench head to the vibratory energy generating means so that vibratory energy in the torsional mode is applied to said wrench head while rotation of the latter is accomplished through said handle portion.

8. A vibratory wrenching apparatus as claimed in claim 7 wherein said coupling means and said wrench head means together comprise a metal member disposed for delivery of said torsional mode vibratory energy at the terminus of said member.

9. A vibratory wrenching apparatus in accordance with claim 7 wherein said vibratory energy generating means comprises at least a pair of transducers, a coupler mounted to each of the transducers, said couplers being affixed to opposite sides of said wrench head for application of said torsional mode vibratory energy to the latter.

10. A vibratory wrenching apparatus in accordance with claim 7 wherein said wrench includes means for indicating torque transmitted by the wrench.

11. For use with a wrench having a handle portion, at least one beam extending outwardly therefrom and a wrench head mounted on said beam in spaced relation with respect to said handle, an ultrasonic wrenching attachment comprising, tool head means adapted to releasably engage said wrench head, transducer means producing mechanical vibratory energy in the longitudinal mode, and means including a coupler connected to said transducer and said tool head for converting the transducer vibratory energy to torsional mode vibration at the tool head at a frequency in the range of from about 7500 cycles per second to about 90,000 cycles per second.

12. An ultrasonic wrenching attachment as claimed in claim 11 wherein said tool head comprises a sleeve member, said coupling means being attached adjacent one end of said sleeve, the opposite end of said sleeve being free from attachment, an isolator member telescoped into said sleeve and attached thereto spaced from the free end of said sleeve and adapter means associated with said one end of the sleeve receiving a threaded fastener engaging device.

13. A wrenching attachment as claimed in claim 11 wherein said coupling means comprises a metal member terminating in said tool head, said tool head being eccentrically disposed in relation to the shank of said member.

References Cited

UNITED STATES PATENTS

| | | | |
|---|---|---|---|
| 2,086,667 | 7/1937 | Fletcher | 29—407 |
| 2,891,178 | 6/1959 | Elmore | 310—26 |
| 2,891,179 | 6/1959 | Elmore | 310—26 |
| 2,891,180 | 6/1959 | Elmore | 310—26 |
| 3,142,901 | 8/1964 | Bodine | 29—525 |
| 3,184,353 | 5/1965 | Balamuth et al. | 29—526 X |
| 3,257,721 | 6/1966 | Jones | 29—470.1 |
| 3,443,302 | 5/1969 | Junker | 29—428 |

THOMAS H. EAGER, Primary Examiner

U.S. Cl. X.R.

29—526, 240

UNITED STATES PATENT OFFICE

CERTIFICATE OF CORRECTION

Patent No. 3,521,348　　　　　　　　　　　　　July 21, 1970

Gary D. Pruder et al.

It is certified that error appears in the above identified patent and that said Letters Patent are hereby corrected as shown below:

Column 10, line 24, after "fastener," insert -- applying torsional mode vibratory energy to the threaded fastener --.

Signed and sealed this 16th day of February 1971.

(SEAL)
Attest:

Edward M. Fletcher, Jr.　　　　　　　　　　WILLIAM E. SCHUYLER, JR.
Attesting Officer　　　　　　　　　　　　　　Commissioner of Patents